United States Patent [19]

Obering

[11] Patent Number: 5,090,743
[45] Date of Patent: Feb. 25, 1992

[54] COMPRESSIBLE FITTING AND ASSOCIATED METHOD

[75] Inventor: Heinz U. Obering, Mülheim/Ruhr, Fed. Rep. of Germany

[73] Assignee: Mannesmann Aktiengesellschaft, Düsseldorf, Fed. Rep. of Germany

[21] Appl. No.: 537,443

[22] Filed: Jun. 12, 1990

[30] Foreign Application Priority Data

Jun. 12, 1989 [DE] Fed. Rep. of Germany ....... 3919496

[51] Int. Cl.⁵ .......................................... F16L 41/02
[52] U.S. Cl. .................... 285/156; 285/174; 285/179; 285/238; 285/286; 285/423; 285/382; 285/424; 29/890.148
[58] Field of Search ...................... 285/382, 382.2, 238, 285/239, 156, 424, 179, 287, 286, 174, 423; 29/890.148

[56] References Cited

U.S. PATENT DOCUMENTS

| | | | |
|---|---|---|---|
| 1,059,438 | 4/1913 | Clark | 285/287 X |
| 1,850,049 | 1/1932 | Cornell, Jr. | |
| 2,005,969 | 6/1935 | Cornell, Jr. | 285/179 X |
| 2,025,973 | 6/1935 | Cornell, Jr. | |
| 2,398,788 | 4/1946 | Hedrick | 285/424 X |
| 3,149,861 | 9/1964 | Larsson | 285/382.2 X |
| 3,976,314 | 8/1976 | Graham | 285/423 X |
| 4,620,729 | 11/1986 | Kauffman | 285/915 X |
| 4,776,616 | 10/1988 | Umehara et al. | 285/156 |
| 4,893,848 | 1/1990 | Melcher | 285/423 X |

FOREIGN PATENT DOCUMENTS

2719882 11/1978 Fed. Rep. of Germany ... 285/382.2

Primary Examiner—Randolph A. Reese
Assistant Examiner—Heather Chun
Attorney, Agent, or Firm—Thomas N. Ljungman

[57] ABSTRACT

A compressible fitting for the manufacture of a permanent, tight connection between tubes. The fitting has at least one end, which has a hook-shaped cross section and a bead-like configuration, which end holds an O-ring and can be compressed with the tube. An adjacent cylindrical section extending in the longitudinal direction, which is provided at the end with a bead-shaped recess acting as a stop for the flat-ended tube which can be inserted. To create a compressible fitting that can be economically manufactured and still provide rapid connection technology, the invention proposes that the area characterizing the type of fitting is designed as a cast or molded basic body fabricated from a metal or non-metal material, that is connected to a standardized connection piece made of sheet metal, whereby this connection piece has a bead-like end holding an O-ring and an adjacent cylindrical area, which is provided at the end with a bead-like recess acting as a stop for the flat-ended tube which can be inserted.

17 Claims, 4 Drawing Sheets

COMPRESSIBLE FITTING AND ASSOCIATED METHOD

BACKGROUND OF THE INVENTION

1. Field of the Invention

The present invention relates to a compressible fitting for the fabrication of a permanent, tight connection between tubes.

2. Background Information

Compression fittings made of carbon steel or high-alloy steel, for interior installation, are known in the prior art. A brochure published by Mannesmann Edelstahlrohr GmbH shows such a fitting. The core of this system is a deformable compression fitting fabricated from a section of tube which, depending on whether it is designed as an elbow, tee or reducer, has at least one end that is hook-shaped and bead-like and holds a gasket. Adjacent to this end is a cylindrical area extending in the longitudinal direction. Attached to the end of the extension of this cylindrical area is a bead-shaped recess which extends radially inward and serves as a stop for the flat-ended tube that can be inserted. By means of an activation apparatus that is connected with a locating device having hinged jaws, the bead-like end is plastically deformed and the enclosed gasket is elastically deformed.

In addition, with the same compression process in the cylindrical area of the fitting, in the immediate vicinity of the bead-like end, a bead-shaped recess is pressed and the tube inserted underneath it is compressed along with it. The elastically deformed gasket in this connection system performs the sealing function, while the compressed bead-shaped recess absorbs the longitudinal forces produced by the internal pressure.

A disadvantage of this system is that on account of the high requirements regarding surface quality and dimensional tolerances, the compression fitting is fabricated from a section of a specially manufactured tube, using several deformation and transformation steps. The basic, or initial, tube is usually a seamless or longitudinally-welded tube that is subjected to a heat treatment following cold deformation. This specially manufactured tube requires close tolerances and a high surface quality. To manufacture a compression fitting from this tube, the original tube is cut into sections and the desired final cross section shape is produced by performing several transformation steps, e.g. tapering, crimping and chasing. Since the basic product, or raw material, is already relatively expensive, the compression fitting manufactured from it is also relatively expensive.

OBJECT OF THE INVENTION

One object of the present invention is to create a compressible fitting that can be fabricated more economically, while retaining the rapid connection technology of the prior art.

SUMMARY OF THE INVENTION

The advantage of the proposed compression fittings is that the region defining the type of fitting, e.g. elbow, tee or reducing connector, is cast or molded from a metal or non-metal material and the basic body fabricated in this manner is permanently connected to a standardized connection piece. With an eye toward achieving the most economical solution possible, the invention also proposes that the basic body be made of simple or higher-grade gray cast iron. It is also possible to use a compressible plastic with or without reinforcing fiber filler for the manufacture of the basic body. The standardized connection piece, like the compression fitting of the prior art, has a bead-like end holding an O-ring and an adjacent cylindrical section which, at the end, has a bead-shaped recess (i.e. a reduction of the unobstructed inside diameter) that acts as a stop for the flat-end tube that can be inserted. The connection between the basic body and the connection piece, depending on the material pair in question, is made by soldering or welding, or using adhesives, so that the hole in the connection piece, or fitting, makes a smooth transition into the hole in the basic body. This prevents the occurrence of unacceptably high flow losses on account of eddy formations, or turbulence, at the connection point.

Since, regardless of the type of fitting, the connection pieces are standardized, and large numbers of pieces can be mass produced with the same nominal dimensions, the costs can be reduced even further. Since, moreover, the basic body is manufactured as a mass-produced product, it is significantly cheaper than the corresponding tubular element and the extra costs for the connection of the basic body and the connection piece or pieces are more than offset. An additional advantage is that the connection piece, or fitting, can be manufactured from a flat sheet by punching and deep drawing and it is no longer necessary to manufacture the tube as the original, or primary, product for the fitting.

So that the forces exerted in the axial direction with increasing internal pressures can be safely absorbed, an additional refinement of the invention proposes that, in addition to the region of the connection piece containing a gasket, sections of the cylindrical area to be connected can also be compressed with the inserted tube, thereby improving the mechanical clamping effect.

The proposed compressible fitting is, preferably, suited for the connection of commercially-available conduits, rigid conduits, metal tubing and line pipe in the dimensional range from 10 to 100 mm, with internal pressures up to 100 bar, depending on the nominal width, whereby even greater nominal widths can be handled with this connection system.

The invention is explained in greater detail below, with reference to the accompanying drawings illustrating two embodiments of the compressible fitting.

One aspect of the invention resides broadly in a connector for fluid conducting tubes comprising channeling apparatus having a fluid directing channel. The channeling apparatus is for channeling the fluid from a first fluid conducting tube to a second fluid conducting tube. Fluid conducting connector apparatus is also provided for being mechanically connected to the channeling apparatus. The connector apparatus is for being connected to at least one of the first tube and the second tube. The connector apparatus is configured to channel the fluid from at least one of the first tube and the second tube to the fluid conduction channel of the channeling apparatus. The channeling apparatus comprises a molded material. The connector apparatus comprises a rolled metal sheet material. The connector apparatus comprises apparatus for supporting O-ring apparatus. The connector apparatus is configured to receive at least one of the first tube and the second tube and comprises a tube positioning device for positioning at least one of the first tube and the second tube in connection with the fluid directing channel and the connector apparatus. Also provided is a compressible fitting device for mechanically connecting at least one of the first tube and the second tube to the fluid directing channel of the channeling apparatus. Connecting apparatus for integrally connecting the connector apparatus to the channeling apparatus is also provided.

Another aspect of the invention resides broadly in a method for making a connector for fluid conducting tubes. The connector having channeling apparatus. The channeling apparatus having a fluid directing channel. The channeling apparatus is for channeling the fluid from a first fluid conducting tube to a second fluid conducting tube. Fluid conducting connector apparatus is for being mechanically connected to the channeling apparatus. The connector apparatus is connected to at least one of the first tube and the second tube. The connector apparatus is configured to channel the fluid from at least one of the first tube and the second tube to the fluid conduction channel of the channeling apparatus. The channeling apparatus comprises a molded material. The connector apparatus comprises a rolled metal sheet material. The connector apparatus comprises apparatus for supporting O-ring apparatus. The connector apparatus is configured to receive at least one of the first tube and the second tube. The connector apparatus comprises tube positioning apparatus for positioning at least one of the first tube and the second tube in connection with the fluid directing channel. The connector apparatus further comprises compressible fitting apparatus. The compressible fitting apparatus is for mechanically connecting at least one of the first tube and the second tube to the fluid directing channel of the channeling apparatus. Connecting apparatus is for integrally connecting the connector apparatus to the channeling apparatus. The method comprises the steps of: molding the channel apparatus, forming the connector apparatus from the rolled metal sheet material by bending the sheet material to form a generally cylindrical shape, working the cylindrical shape to form a portion of the connecting apparatus for integrally connecting the connector apparatus to the channeling apparatus, forming the O-ring supporting apparatus on the connector apparatus and integrally connecting the connector apparatus and the channel apparatus.

Yet another aspect of the invention resides broadly in a connector for fluid conducting tubes comprising: channeling apparatus having a fluid directing channel. The channeling apparatus is for channeling the fluid from a first fluid conducting tube to a second fluid conducting tube. Fluid conducting connector apparatus is for being mechanically connected to the channeling apparatus. The connector apparatus is for being connected to at least one of the first tube and the second tube. The connector apparatus is configured to channel the fluid from at least one of the first tube and the second tube to the fluid conduction channel of the channeling apparatus. The channeling apparatus comprises a molded material. The connector apparatus comprises a rolled metal sheet material. The connector apparatus comprises apparatus for supporting O-ring apparatus. The connector apparatus is configured to receive at least one of the first tube and the second tube. The connector means comprises tube positioning apparatus for positioning at least one of the first tube and the second tube in connection with the fluid directing channel. The connector apparatus further comprises compressible fitting apparatus. The compressible fitting apparatus is for mechanically connecting at least one of the first tube and the second tube to the fluid directing channel of the channeling apparatus. The rolled metal sheet material of the connector apparatus is configured to be compressed by a compression tool for forming a seal between at least one of the first tube and the second tube and the connector apparatus. Connecting apparatus is for integrally connecting the connector apparatus to the channeling apparatus.

BRIEF DESCRIPTION OF THE DRAWINGS

The following Description of the Preferred Embodiments may be better understood when taken in conjunction with the appended drawings in which.

DESCRIPTION OF THE PREFERRED EMBODIMENT

Figure 1:
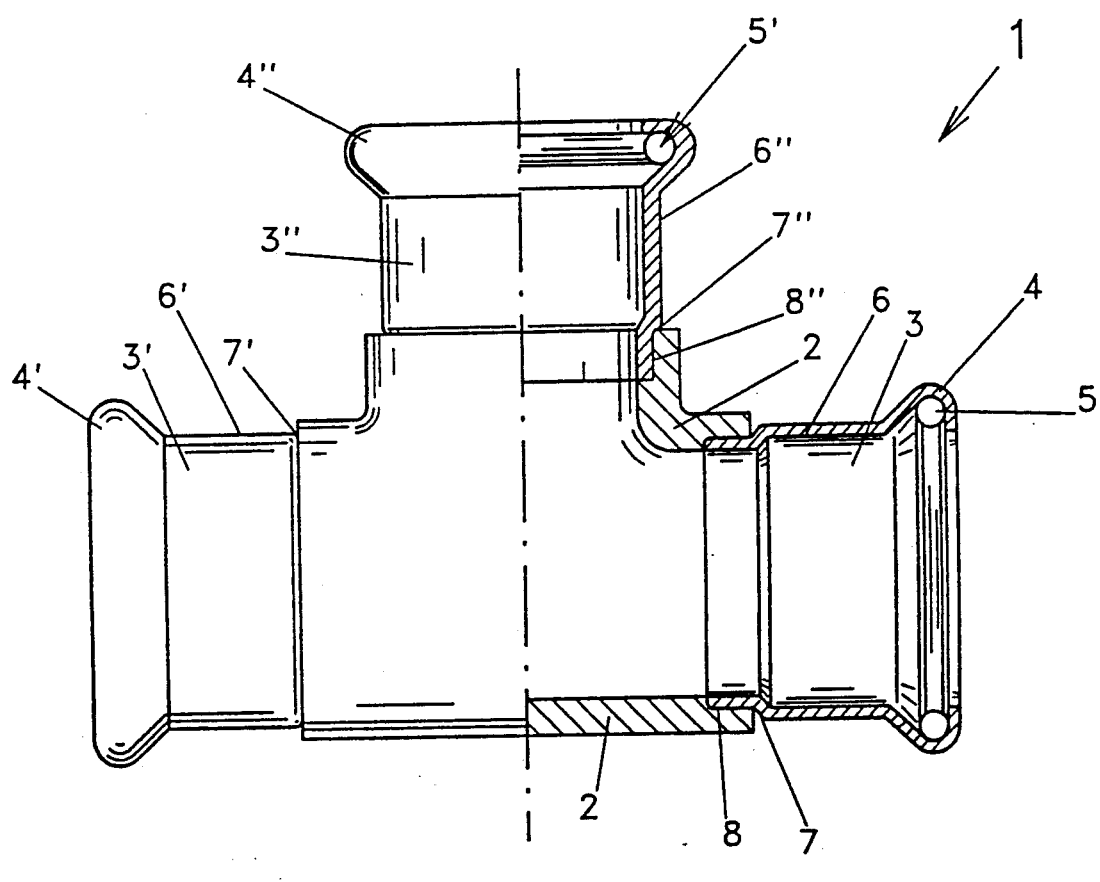
FIG. 1 is a side elevational view, partially in section, of a compressible fitting according to the present invention.

The left half of FIG. 1 shows a side elevational view, and the right half of FIG. 1 shows a section through a compressible fitting according to the invention. In this embodiment the fitting is designed as channeling means, or tee 1 having the same nominal width for the discharge as for the fluid directing channel, or tubular passage. Basic body 2 defines the type of the fitting provided. In this case, basic body 2 is a T-connection, can be a casting, for example, that, in this embodiment, is permanently connected with three identically-configured, standardized fluid conducting connector means, or connection pieces 3, 3' and 3''.

In the case of a tee 1 with a reducing output, the first connector part, or connection piece 3'', connected to the output, would have dimensions which are different from those of the second connector part such as one of connection pieces 3 and 3', that are connected with the tubular passage.

The standardized connection pieces 3, 3' and 3'', are similar to the press fittings of the prior art in that they have bead-like ends 4, 4' and 4'' that define a cavity in which O-rings 5 and 5' are positioned. Adjacent to ends 4, 4' and 4'' are cylindrical sections 6, 6' and 6'', which have bead-shaped, or crimped, tube positioning means or recesses 7, 7' and 7''. Recesses 7, 7' and 7'' act as a stop for the flat-end tube (not shown) that is to be inserted. The recess 7, 7' and 7'' provide a transition to socket-like, or bushing-like, extensions 8 and 8'', which can be inserted in a corresponding boring of basic body 2. For example, connection pieces 3, 3' and 3'' that are inserted into basic body 2, can be connected by fastening means, such as solder, to the basic body 2. That type of connection is preferable when connection pieces 3, 3' and 3'' are fabricated from carbon steel. The connection could also be made using a fastening means such as a high-strength adhesive.

The dimensions of socket-like extensions 8 and 8'' are coordinated with the dimensions of the boring in basic body 2 so that a flat and flush connection is achieved between body 2 and connection pieces 3, 3' and 3''. The compression of connection pieces 3, 3' and 3'' against the tube (not shown) is done, as is well known in the prior art by means of a standard compression tool. During the compression, the diameter of bead-like ends 4, 4' and 4" are reduced and the cavity in bead-like ends 4, 4' and 4" are reduced in size, so that enclosed O-rings 5 and 5" are elastically deformed to achieve the desired sealing effect.

Figure 2:
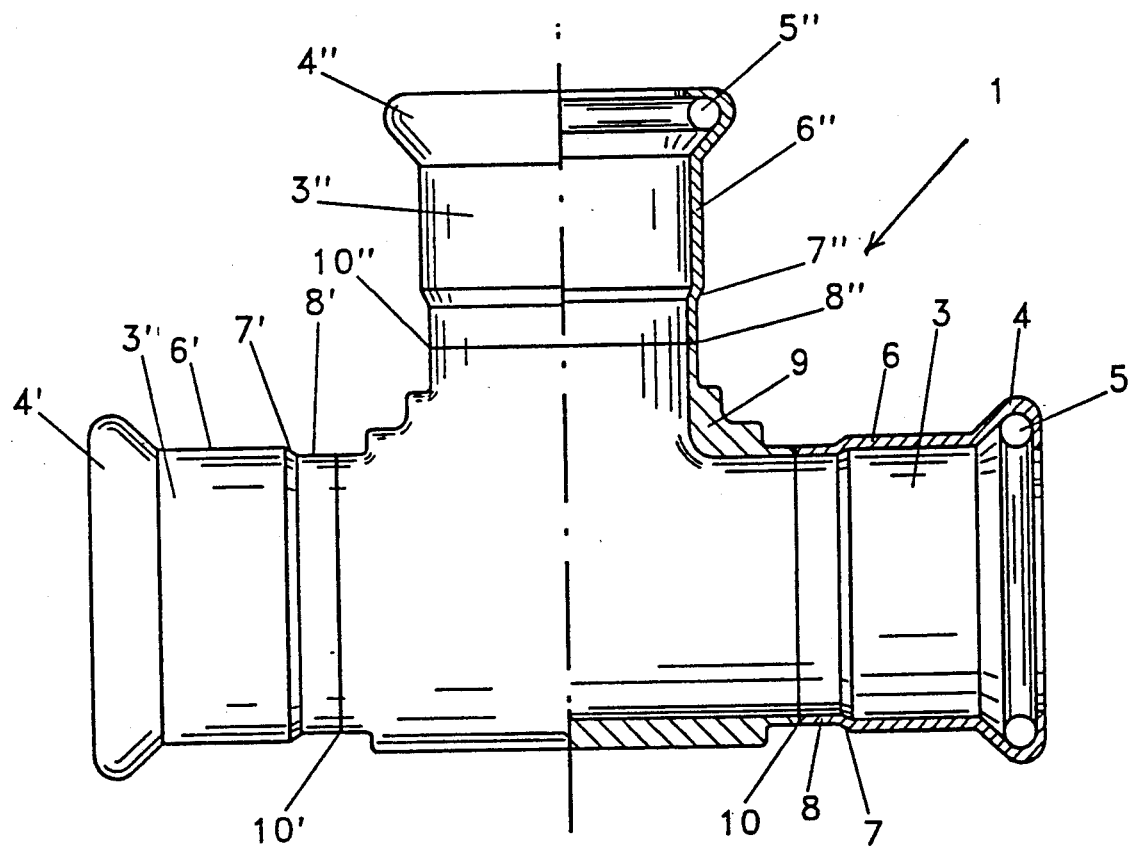
FIG. 2 is a side elevational view, partially in section, of a different embodiment of the present invention from that shown in FIG. 1.

FIG. 2 shows another embodiment of the claimed invention. The same identification numbers are used for the same parts. One difference between the embodiment shown in FIG. 1 and that shown in FIG. 2 is that the standardized connection pieces 3, 3' and 3" are connected to base body 9 by means of welded seams 10, 10' and 10". That type of connection is, preferably, used for connection pieces 3, 3' and 3" that are made of high-grade steel. With that type of connection, there is also a flat and flush internal transition at the connection point. Also, shown in FIG. 2 is O-ring 5". In the embodiment shown in FIG. 2, the external dimensions of the tee are slightly larger than in the embodiment illustrated in FIG. 1.

Figure 3:
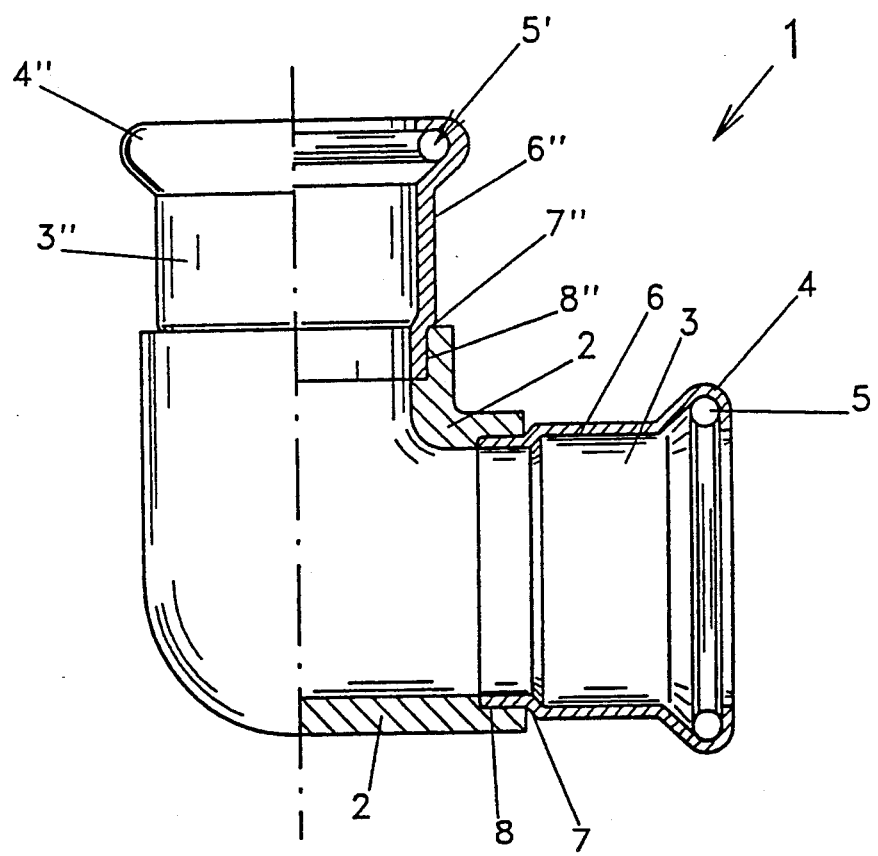
FIG. 3 is a side elevational view, partially in section, of an elbow fitting according to the present invention.
Figure 4:
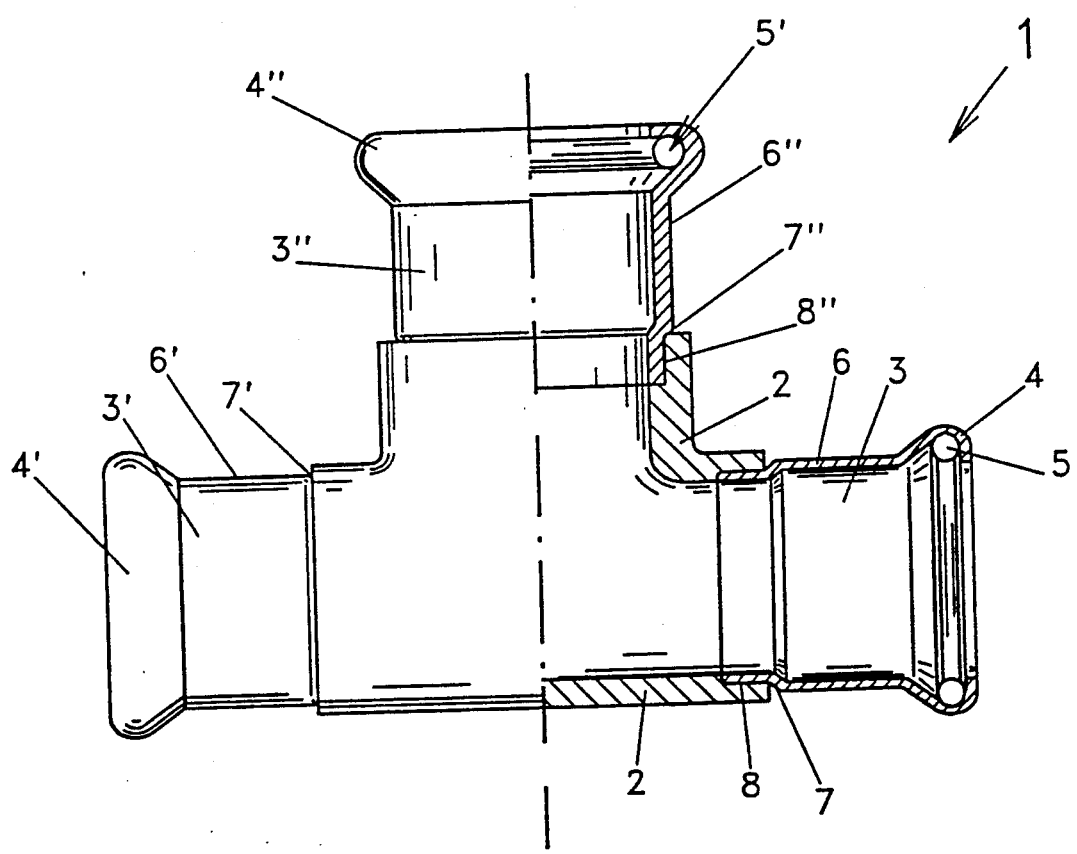
FIG. 4 is a side elevational view, partially in section, of a reducer fitting according to the present invention.

FIGS. 3 and 4 show, respectively, an elbow fitting and a reducer fitting according to the present invention. The same identification numbers are used in FIGS. 3 and 4 as are used for the same parts in FIGS. 1 and 2.

It may be appreciated that the present invention facilitates the connection of tubes by providing connectors having dimensions with adequate tolerances, or fit, with the tubes to which they are to be connected. Further, the present invention provides a fluid connection between the basic body and the connector within necessary tolerances to achieve a fluid tight seal between those members.

Also, in certain instances it may be acceptably if the tolerance of the dimensions of the connector be tighter than the tolerance of the dimensions of the basic body. In other instances it may be acceptable if the tolerance of the dimensions of the basic body be tighter than the tolerance of the dimensions of the connector. The present invention facilitates the proper dimensions of the basic body and the connector to desired tolerances since the connector and the basic body each are manufactured separately and can, thus, each be manufactured to a desired level of dimensional tolerance.

A variety of thicknesses of sheet metal may be employed to form connection pieces 3, 3' and 3". Examples include:

| Gauge of Metal | Approximate Thickness (inches) |
| --- | --- |
| 10 | .134 |
| 11 | .125 |
| 14 | .075 |
| 16 | .060 |
| 18 | .048 |
| 20 | .036 |
| 24 | .024 |

Such sheet metal may be hot or cold rolled and may be carbon steel and may be galvanized.

In summary, one feature of the invention resides broadly in a compressible fitting for the manufacture of a permanent, tight connection between tubes, which has at least one end which has a hook-shaped cross section and has a bead-like configuration, which end holds an O-ring and can be compressed with the tube, and an adjacent cylindrical section extending in the longitudinal direction, which is provided at the end with a bead-like recess acting as a stop for the flat-ended tube which can be inserted, and adjacent to which is an area characterizing the type of the fitting, wherein the area characterizing the type of fitting is designed as a cast or molded basic body 2, 9 manufactured from a metal or non-metal material, which is permanently connected to a standardized connection piece 3, 3', 3" made of sheet metal, whereby this connection piece 3, 3', 3" in the manner of the prior art has a bead-like end 4, 4', 4" holding an O-ring 5, 5" and an adjacent cylindrical area 6, 6', 6", which is provided at the end with a bead-shaped recess 7, 7', 7" acting as a stop for the flat-ended tube which can be inserted.

Another feature of the invention resides broadly in a compressible fitting wherein the connection between the basic body 2 and the connection piece 3, 3', 3" has a soldered seam.

Yet another feature of the invention resides broadly in a compressible fitting wherein the connection between the basic body 9 and connection piece 3, 3', 3" has a welded seam 10, 10', 10".

A further feature of the invention resides broadly in a compressible fitting wherein the basic body 2, 9 and connection piece 3, 3', 3" are connected to one another by means of adhesive.

A yet further feature of the invention resides broadly in a compressible fitting wherein the connection piece 3, 3', 3" is fabricated from a flat sheet metal section.

Yet another further feature of the invention resides broadly in a compressible fitting wherein the connection piece 3, 3', 3" is fabricated from a flat-ended tube section.

An additional feature of the invention resides broadly in a compressible fitting wherein additionally, sections of the cylindrical area 6, 6', 6" adjacent to the end with a bead-like configuration 4, 4', 4" are also compressed with the tube.

A yet additional feature of the invention resides broadly in a compressible fitting wherein in the vicinity of the connection point, the hole in the connection piece 3, 3', 3" makes a flat and flush transition into the hole in the basic body 2, 9.

A further additional feature of the invention resides broadly in a compressible fitting wherein the basic body 2, 9 is a gray cast iron casting.

A yet further additional feature of the invention resides broadly in a compressible fitting wherein the basic body 2, 9 is a plastic molding.

Another further additional feature of the invention resides broadly in a compressible fitting wherein the molding is reinforced with fibers.

Some examples of compression fittings can be found in U.S. Pat. No. 4,891,877, entitled "Portable Tool for Compressing a Fitting on a Hose" and U.S. Pat. No. 4,567,841, entitled "Fairing Assembly for Towed Underwater Cables."

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Dimensions, angles, etc. as depicted in the appended drawings may be to scale and form part of this specification.

The invention as described hereinabove in the context of the preferred embodiments is not to be taken as limited to all of the provided details thereof, since modifications and variations thereof may be made without departing from the spirit and scope of the invention.

What is claimed is:

1. A connector for fluid conducting tubes comprising: channeling means having a fluid directing channel, said channeling means for channeling the fluid from a first fluid conducting tube to a second fluid conducting tube;
   fluid conducting connector means for being mechanically connected to said channeling means, said connector means for being connected to at least one of the first tube and the second tube;
   said connector means being configured to channel the fluid from at least one of the first tube and the second tube to said fluid directing channel of said channeling means;
   said channeling means comprising a single piece formed from molded material;
   said connector means comprising a rolled metal sheet material;
   said connector means comprising means for supporting O-ring means;
   said connector means being configured to receive at least one of the first tube and the second tube;
   said connector means comprising tube positioning means for positioning at least one of the first tube and the second tube in connection with said fluid directing channel;
   said connector means further comprising compressible fitting means, said compressible fitting means for mechanically connecting at least one of the first tube and the second tube to said fluid directing channel of said channeling means; and
   fastening means for integrally and permanently connecting said connector means to said channeling means.

2. The connector of claim 1, wherein said fastening means is a weld.

3. The connector of claim 2, wherein said connector means comprises a surface that is configured to minimize flow losses through said connector means.

4. The connector of claim 3, wherein said channeling means comprises a gray cast iron casting.

5. The connector of claim 4, further including:
   an O-ring being supported by said means for supporting O-ring means;
   said tube positioning means comprising stop means for positioning at least one of the first tube and the second tube in connection with said fluid directing channel;
   said connector means comprising a first connector part;
   said connector means comprising a second connector part;
   said first connector part having an interior dimension being larger than an interior dimension of said second connector part;
   said stop means being positioned adjacent said first connector part and said second connector part;
   said means for supporting O-ring means defining a hook-shape cross-section; and
   said channeling means comprising a tee.

6. A method for making a connector for fluid conducting tubes, said connector having channeling means, said channeling means having a fluid directing channel, said channeling means for channeling the fluid from a first fluid conducting tube to a second fluid conducting tube, fluid conducting connector means for being mechanically connected to said channeling means, said connector means for being connected to at least one of the first tube and the second tube, said connector means being configured to channel the fluid from at least one of the first tube and the second tube to said fluid directing channel of said channeling means, said channeling means comprising a molded material, said connector means comprising a rolled metal sheet material, said connector means comprising means for supporting O-ring means, said connector means being configured to receive at least one of the first tube and the second tube, said connector means comprising tube positioning means for positioning at least one of the first tube and the second tube in connection with said fluid directing channel, said connector means further comprising compressible fitting means, said compressible fitting means for mechanically connecting at least one of the first tube and the second tube to said fluid directing channel of said channeling means, fastening means for integrally and permanently connecting said connector means to said channeling means, said method comprising the steps of:
   molding said channeling means;
   forming said connector means from said rolled metal sheet material by bending said sheet material to form a generally cylindrical shape;
   forming said fastening means for integrally and permanently connecting said connector means to said channeling means;
   forming said O-ring supporting means on said connector means; and
   integrally and permanently connecting said connector means to said channeling means with said fastening means.

7. The method of claim 6, further including the step of integrally and permanently connecting said connector means and said channeling means together by a weld.

8. The method of claim 7, further including the step of configuring at least one of said channeling means and said connector means to minimize flow losses through at least one of said channeling means and said connector means.

9. The method of claim 8, further including the step of molding said channeling means from gray cast iron.

10. The method of claim 9, further including the step of forming said connector means from flat sheet metal.

11. The method of claim 10, further including the step of compressing said O-ring supporting means to attach at least one of the first tube and the second tube to said connector means.

12. The method of claim 11, further including the steps of:
    supporting an O-ring by said O-ring supporting means;
    forming said tube positioning means in said connector means;
    forming said tube positioning means to have a hook-shape cross-sectional configuration;
    molding said channeling means to form an elbow.

13. A connector for fluid conducting tubes comprising:

channeling means having a fluid directing channel, said channeling means for channeling the fluid from a first fluid conducting tube to a second fluid conducting tube;

fluid conducting connector means for being mechanically connected to said channeling means, said connector means for being connected to at least one of the first tube and the second tube;

said connector means being configured to channel the fluid from at least one of the first tube and the second tube to said fluid directing channel of said channeling means;

said channeling means comprising a molded material;

said connector means comprising a rolled metal sheet material;

said connector means comprising means for supporting O-ring means;

said connector means being configured to receive at least one of the first tube and the second tube;

said connector means comprising tube positioning means for positioning at least one of the first tube and the second tube in connection with said fluid directing channel;

said connector means further comprising compressible fitting means, said compressible fitting means for mechanically connecting at least one of the first tube and the second tube to said fluid directing channel of said channeling means;

said rolled metal sheet material of said connector means being configured to be compressed by a compression tool for forming a seal between at least one of the first tube and the second tube and said connector means; and fastening means for integrally and permanently connecting said connector means to said channeling means.

14. The connector of claim 13, wherein said fastening means is an adhesive.

15. The connector of claim 14, wherein said connector means comprises a surface that is configured to minimize flow losses through said connector means.

16. The connector of claim 15, wherein said channeling means comprises a fiber reinforced plastic molding.

17. The connector of claim 16, further including:

an O-ring being supported by said means for supporting O-ring means;

said tube positioning means comprising stop means for positioning at least one of the first tube and the second tube in connection with said fluid directing channel;

said connector means comprising a first connector part;

said connector means comprising a second connector part;

said first connector part having an interior dimension being larger than an interior dimension of said second connector part;

said stop means being positioned adjacent said first connector part and said second connector part;

said means for supporting O-ring means defining a hook-shape cross-section; and said channeling means comprising a reducer.

* * * * *

UNITED STATES PATENT AND TRADEMARK OFFICE
CERTIFICATE OF CORRECTION

PATENT NO. : 5,090,743

DATED : February 25, 1992

INVENTOR(S) : Heinz UNEWISSE

It is certified that error appears in the above-identified patent and that said Letters Patent is hereby corrected as shown below:

On the Title page, item [54], Delete "Heinz U. Obering" and insert

---Heinz UNEWISSE---

Signed and Sealed this

Twenty-first Day of September, 1993

Attest:

BRUCE LEHMAN

Attesting Officer     Commissioner of Patents and Trademarks